United States Patent
Abd Elhamid et al.

(10) Patent No.: US 8,906,579 B2
(45) Date of Patent: Dec. 9, 2014

(54) LOW CONTACT RESISTANCE COATED STAINLESS STEEL BIPOLAR PLATES FOR FUEL CELLS

(75) Inventors: Mahmoud H. Abd Elhamid, Grosse Pointe Woods, MI (US); Gayatri Vyas Dadheech, Rochester Hills, MI (US); Arianna T. Morales, Royal Oak, MI (US); Maria C. Militello, Macomb, MI (US)

(73) Assignee: GM Global Technology Operations LLC, Detroit, MI (US)

(*) Notice: Subject to any disclaimer, the term of this patent is extended or adjusted under 35 U.S.C. 154(b) by 721 days.

(21) Appl. No.: 12/465,963

(22) Filed: May 14, 2009

(65) Prior Publication Data
US 2010/0291464 A1    Nov. 18, 2010

(51) Int. Cl.
| H01M 4/64 | (2006.01) |
| H01M 4/66 | (2006.01) |
| H01M 2/38 | (2006.01) |
| H01M 2/40 | (2006.01) |
| H01M 8/24 | (2006.01) |
| B05D 5/12 | (2006.01) |
| H01M 8/10 | (2006.01) |
| H01M 8/02 | (2006.01) |

(52) U.S. Cl.
CPC .... *H01M 8/0208* (2013.01); *H01M 2008/1095* (2013.01); *H01M 8/0267* (2013.01); *Y02E 60/50* (2013.01); *H01M 8/0228* (2013.01); *H01M 8/021* (2013.01)
USPC ............ 429/519; 429/457; 429/518; 427/115

(58) Field of Classification Search
USPC .......................... 429/457, 518, 519; 427/115
See application file for complete search history.

(56) References Cited

U.S. PATENT DOCUMENTS

| 6,869,718 B2* | 3/2005 | Yasuo et al. ................. 429/509 |
| 7,955,754 B2* | 6/2011 | Abd Elhamid et al. ....... 429/518 |
| 2003/0190515 A1* | 10/2003 | Brady et al. .................... 429/34 |
| 2006/0019142 A1* | 1/2006 | Abd Elhamid et al. ......... 429/34 |
| 2007/0141439 A1* | 6/2007 | Vyas et al. ...................... 429/38 |

FOREIGN PATENT DOCUMENTS

| CN | 101257119 A | 9/2008 |
| DE | 19523637 | 6/1995 |
| DE | 69906860 T2 | 5/1999 |
| DE | 112006001164 T5 | 6/2008 |
| DE | 102007010538 | 9/2008 |

OTHER PUBLICATIONS

HPAlloy C-276 Product Description, Oct. 2011, pp. 1-4.*
JLC Electromet—History and Milestones and Nickel—Chromium: Heating Element and Resistance Alloys, copyright 2000 (3 pages).*

* cited by examiner

*Primary Examiner* — Patrick Ryan
*Assistant Examiner* — Julian Anthony
(74) *Attorney, Agent, or Firm* — Dinsmore & Shohl LLP

(57) ABSTRACT

A bipolar plate to reduce electrical contact resistance between the plate and a diffusion layer used in a fuel cell. The opposing surfaces of the plate define flow channels with upstanding lands interspersed between them. The lands of the plate form an electrically-conductive contact with a diffusion layer in the fuel cell. At least a portion of the electrically-conductive contact is made up of a nickel-based alloy that reduces the contact resistance between the plate and the diffusion layer as a way to achieve improved electric current density. In one form, the alloy can be used as the primary material in the plate, while in another, it can be used as a coating deposited onto a conventional stainless steel plate.

17 Claims, 5 Drawing Sheets

LOW CONTACT RESISTANCE COATED STAINLESS STEEL BIPOLAR PLATES FOR FUEL CELLS

BACKGROUND OF THE INVENTION

The present invention relates generally to a stainless steel alloy bipolar plate that exhibits low electrical contact resistance in a fuel cell environment, and more particularly to an assembly made from such a bipolar plate with a coating to reduce the contact resistance between the plate and a diffusion layer or related current-carrying component placed against the plate.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. An appropriate catalyst (for example, platinum) is typically disposed as a layer and used to facilitate hydrogen oxidation at the anode side and oxygen reduction at the cathode side. From this, electric current is produced with high temperature water vapor as a reaction byproduct. In one form of fuel cell, called the proton exchange membrane or polymer electrolyte membrane (in either event, PEM) fuel cell, an electrolyte in the form of an ionomer membrane is assembled between the anode and cathode. This layered structure is commonly referred to as a membrane electrode assembly (MEA), and is further layered between diffusion layers that allow both gaseous reactant flow to and electric current flow from the MEA. The aforementioned catalyst layer may be disposed on or as part of the diffusion layer.

To increase electrical output, individual fuel cell units are stacked with electrically conductive bipolar plates disposed between the diffusion layer and anode electrode of one MEA and the diffusion layer and cathode electrode of an adjacent MEA. In such a configuration, the bipolar plates separating adjacently-stacked MEAs have opposing surfaces each of which include flow channels separated from one another by raised lands. The channels act as conduit to convey hydrogen and oxygen reactant streams to the respective anode and cathode of the MEA, while the lands, by virtue of their contact with the electrically conductive diffusion layer that is in turn in electrical communication with current produced at the catalyst sites, act as a transmission path for the electricity generated in the MEA. In this way, current is passed through the lands of the bipolar plate and the electrically-conductive diffusion layer. Typically, the bipolar plates are made from graphite or a metal in order to be an electrically conductive link between the MEA and an external electric circuit.

Bipolar plates made from graphite are resistant to corrosion, exhibit good electrical conductivity and low specific density. Nevertheless, graphite plates are permeable to hydrogen, which can lead to significant losses in performance and efficiency. Moreover, graphite is difficult to manufacture, resulting in plates that are expensive and thicker than their metal-based counterparts. Thus, in situations where cost of fuel cell manufacture is an important consideration, metal-based bipolar plates may be preferable to graphite. In addition to being relatively inexpensive, metal plates can be formed into thin members, having sheet thickness of less than 0.25 millimeters, for example.

Because the bipolar plate operates in a high temperature and corrosive environment, conventional metals, such as plain carbon steel, may not be suitable for certain applications (such as automotive applications) where long life (for example, about 10 years with 6000 hours of life) is required. During typical PEM fuel cell stack operation, the proton exchange membranes are at a temperature in the range of between about 75° C. and about 175° C., and at a pressure in the range of between about 100 kPa and 200 kPa absolute. Under such conditions, plates made from noble metals may be advantageous, as they have desirable corrosion-resistant properties. Unfortunately, they are very expensive, thereby limiting their viability in transportation-related and related cost-sensitive applications. Furthermore, some metals, such as nickel (at least when used alone) experiences severe corrosion inside a fuel cell environment. Thus, despite the fact that nickel my be appropriate for use in an alkaline media, its use in a PEM does not follow.

Steel alloys, which can be formed into very thin (for example, between 0.1 and 1.0 mm) sheets, are considerably less expensive, but may not exhibit adequate corrosion resistance. Stainless steel (for example, in the form of iron-chromium or related compounds), with its improved corrosion resistance through the formation of oxides on the plate surface, may also be used; however, the tendency of stainless steel bipolar plates to passivate to achieve this increase in corrosion resistance also increases the contact resistance between the plate and an adjacent diffusion layer.

Transition metal coatings, such as titanium nitride (TiN), have been proposed to avoid the buildup of high contact resistance on the surface of stainless steel bipolar plates. While initial electrical resistance may drop, the conditions encountered in a fuel cell over time (especially at elevated temperatures) cause the TiN to convert to titanium dioxide ($TiO_2$), which actually increases the contact resistance, thereby achieving a result opposite of that intended. As such, there remains a desire to provide stainless steel alloy-based bipolar plates that exhibit corrosion resistance and low contact resistance for use in a fuel cell. There is also a desire to make a bipolar plate that exhibits similar corrosion and contact resistance properties to those of noble metal-based or graphite-based bipolar plates while avoiding their high cost of manufacture.

BRIEF SUMMARY OF THE INVENTION

These desires are met by the present invention, where according to an aspect of the present invention, a stainless steel bipolar plate for a fuel cell is disclosed. The plate includes opposing surfaces at least one of which comprises a plurality of flow channels formed therein. Numerous lands project outward from the plate surface relative to the channels, and form an electrically-conductive contact with a fuel cell diffusion layer placed in contact therewith. At least a portion of this contact is formed by a nickel-based alloy that exhibits lower contact resistance between the bipolar plate and the diffusion layer than if no such alloy were present. For example, if the plate were made entirely of a stainless steel that did not employ the nickel-based alloy coating or layer, it would be expected that such a plate would be subject to the passivation problems discussed above.

Optionally, the stainless steel used in the bipolar plate comprises an austenitic stainless steel. Such a configuration is valuable when the nickel-based alloy is in the form of a coating, as discussed in more detail below. Such a configuration is also valuable in situations where at least some of the iron that is inherently present in the austenitic stainless steel can be removed from the contact surface of the bipolar plate. In other options, preferred forms of the nickel-chromium (also referred to as nickel-chrome) based alloy include an alloy with at least 60 percent by weight nickel. As stated above, the nickel-based alloy may be configured as a coating disposed on at least a portion of the plate surface, such as the numerous lands. In such case, the coating may include a nickel-chrome binary alloy, having between 80 percent by weight nickel and 20 percent by weight chromium. While the binary alloys and other nickel-based materials discussed herein are preferable, it will be appreciated that the alloys should have the same overall compositions; however, when using the alloy as a bipolar plate material, alloys with a nickel content down to 30 weight percent can be used provided that surface texturing is done to the plate surface to reduce contact resistance to acceptable levels, as roughness can help reduce contact resistance. Alternatively, we can start with alloys that have lower nickel content, and then heat treat them to dissolve iron preferentially from the top surface, thereby leaving behind a nickel-chromium layer that has a lower contact resistance. Furthermore, a binary alloy may be used as the primary plate structural material. In addition to nickel-based alloys, iron-chromium alloys may be used because they have higher corrosion resistance than iron-nickel substrate materials. Nickel-chromium binary alloys and nickel-iron binary alloys may be suitable for the plate structural material, coating or both. Thus, if we start with an alloy with a relatively low nickel content inside, the alloy can be treated so that it will extract the iron out of the top surface of the alloy, leaving behind a layer that is rich in nickel and chromium, thereby mimicking a nickel-chrome alloy that will have much lower conductivity than the original alloy, but at the same have lower cost like the original alloy.

According to another aspect of the invention, a device with one or more PEM fuel cells is disclosed. Each fuel cell includes an MEA, a diffusion media and a bipolar plate. Fluid communication is established between the channels of the plate and the diffusion media such that a reactant introduced into the bipolar plate travels along the plate channels, through the diffusion media and into contact with an appropriate one of the MEA's anode or cathode. Electric current can be passed between the bipolar plate and the diffusion media through contact between them, where a nickel-based alloy helps promote the high electrical conductivity of the interface between the bipolar plate and the diffusion media.

Optionally, and as discussed in conjunction with the previous aspect, such alloy may be used as the primary material constituent of the plate itself, or may be deposited onto a conventional stainless steel alloy plate such that the nickel-based alloy establishes the electrical contact. The nickel-based alloy may be a binary alloy, such as nickel-chromium alloys, or may be more highly-alloyed, containing (in addition to a majority nickel) other metals, such as those found in stainless steels. The device may additionally include a fuel processing system for providing the fuel cell with the first reactant (such as hydrogen gas). The device may also include a vehicle coupled to fuel cell such that an electrochemical catalytic reaction produced in the fuel cell with a reactant produced by the fuel processing system provides at least a portion of the vehicle motive power needs.

According to yet another aspect of the invention, a method of preparing a polymer electrode membrane fuel cell is disclosed. The method includes arranging an MEA such that it includes an anode, cathode and membrane disposed between the anode and cathode. In addition, an anode diffusion layer is placed in fluid communication with the anode of the MEA, while a cathode diffusion layer is placed in fluid communication with the cathode. Furthermore, a stainless steel bipolar plate has numerous flow channels and lands interspersed on at least one of the surfaces of the plate such that upon operation of the fuel cell, reactants introduced from a respective fuel source and oxygen source can be delivered to the anode and the cathode through a flowpath established by the bipolar plate. Placement of the bipolar plate in contact with a respective one of the anode diffusion layer and the cathode diffusion layer is such that the outwardly-projecting lands form an electrically-conductive contact with the respective diffusion layer placed against it. To promote a high degree of electrical conductivity, at least a portion of the contact between the diffusion layers and the bipolar plate is made from a nickel-chrome based alloy configured to reduce contact resistance relative to a contact made between where no such alloy is present.

Optionally, the nickel-chrome based alloy is configured as a coating disposed on at least a portion of the plurality of lands. In one form, the coating is disposed on at least a portion of the lands using an arc vapor deposition, E-beam evaporation, sputtering, electroplating or a related technique. In one preferred form, the coating comprises at least 60 percent by weight nickel. Furthermore, the method may include removing at least some of the iron that is initially present in the nickel-based alloy. By doing this, the top layer of the electrically-conductive contact formed between the plate and the diffusion layer may be rich in nickel-chromium. In this way, a relatively low-cost (i.e., entry grade) austenitic stainless steel can be used to achieve both low cost and low contact resistance. More particularly, the iron may be removed by heat treating the alloy used for the electrically-conductive contact, and then subjected to a chemical dissolving step to remove the iron oxide scale thereafter.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
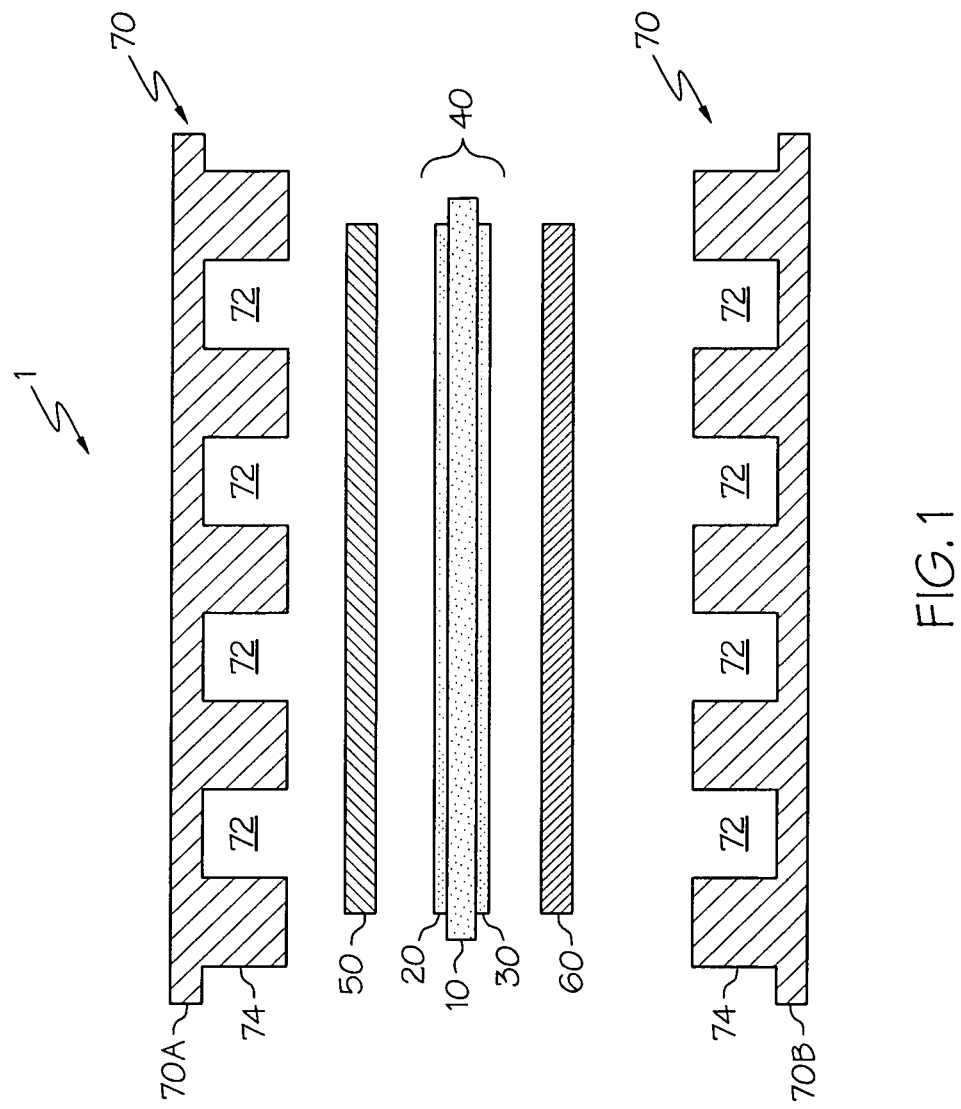
FIG. 1 is an illustration of a partially exploded, sectional view of a portion of a conventional fuel cell and surrounding bipolar plates.

Referring initially to FIG. 1, a partial, sectional view of a conventional PEM fuel cell 1 in exploded form is shown. The fuel cell 1 includes a substantially planar proton exchange membrane 10, anode catalyst layer 20 in facing contact with one face of the proton exchange membrane 10, and cathode catalyst layer 30 in facing contact with the other face. Collectively, the proton exchange membrane 10 and catalyst layers 20 and 30 are referred to as the membrane electrode assembly (MEA) 40. An anode diffusion layer 50 is arranged in facing contact with the anode catalyst layer 20, while a cathode diffusion layer 60 is arranged in facing contact with the cathode catalyst layer 30. Each of diffusion layers 50 and 60 are made with a generally porous construction to facilitate the passage of gaseous reactants to the catalyst layers 20 and 30. Collectively, anode catalyst layer 20 and cathode catalyst layer 30 are referred to as electrodes, and can be formed as separate distinct layers as shown, or in the alternate, as embedded at least partially in diffusion layers 50 or 60 respectively, as well as embedded partially in opposite faces of the proton exchange membrane 10.

In addition to providing a substantially porous flowpath for reactant gases to reach the appropriate side of the proton exchange membrane 10, the diffusion layers 50 and 60 provide electrical contact between the electrode catalyst layers 20, 30 and the bipolar plate 70 (through lands 74) that in turn acts as a current collector. Moreover, by its generally porous nature, the diffusion layers 50 and 60 also form a conduit for removal of product gases generated at the catalyst layers 20, 30. Furthermore, the cathode diffusion layer 60 generates significant quantities of water vapor in the cathode diffusion layer. Such feature is important for helping to keep the proton exchange membrane 10 hydrated. Water permeation in the diffusion layers can be adjusted through the introduction of small quantities of polytetrafluoroethylene (PTFE) or related material.

Simplified opposing surfaces 70A and 70B of a pair of bipolar plates 70 are provided to separate each MEA 40 and accompanying diffusion layers 50, 60 from adjacent MEAs and layers (neither of which are shown) in a stack. One plate 70A engages the anode diffusion layer 50 while a second plate 70B engages the cathode diffusion layer 60. Each plate 70A and 70B (which upon assembly as a unitary whole would make up the bipolar plate 70) defines numerous reactant gas flow channels 72 along a respective plate face. Lands 74 separate adjacent sections of the reactant gas flow channels 72 by projecting toward and making direct contact with the respective diffusion layers 50, 60. In operation, a first gaseous reactant, such as hydrogen, is delivered to the anode 20 side of the MEA 40 through the channels 72 from plate 70A, while a second gaseous reactant, such as oxygen (typically in the form of air) is delivered to the cathode 30 side of the MEA 40 through the channels 72 from plate 70B. Catalytic reactions occur at the anode 20 and the cathode 30 respectively, producing protons that migrate through the proton exchange membrane 10 and electrons that result in an electric current that may be transmitted through the diffusion layers 50 and 60 and bipolar plate 70 by virtue of contact between the lands 74 and the layers 50 and 60.

Figure 2:
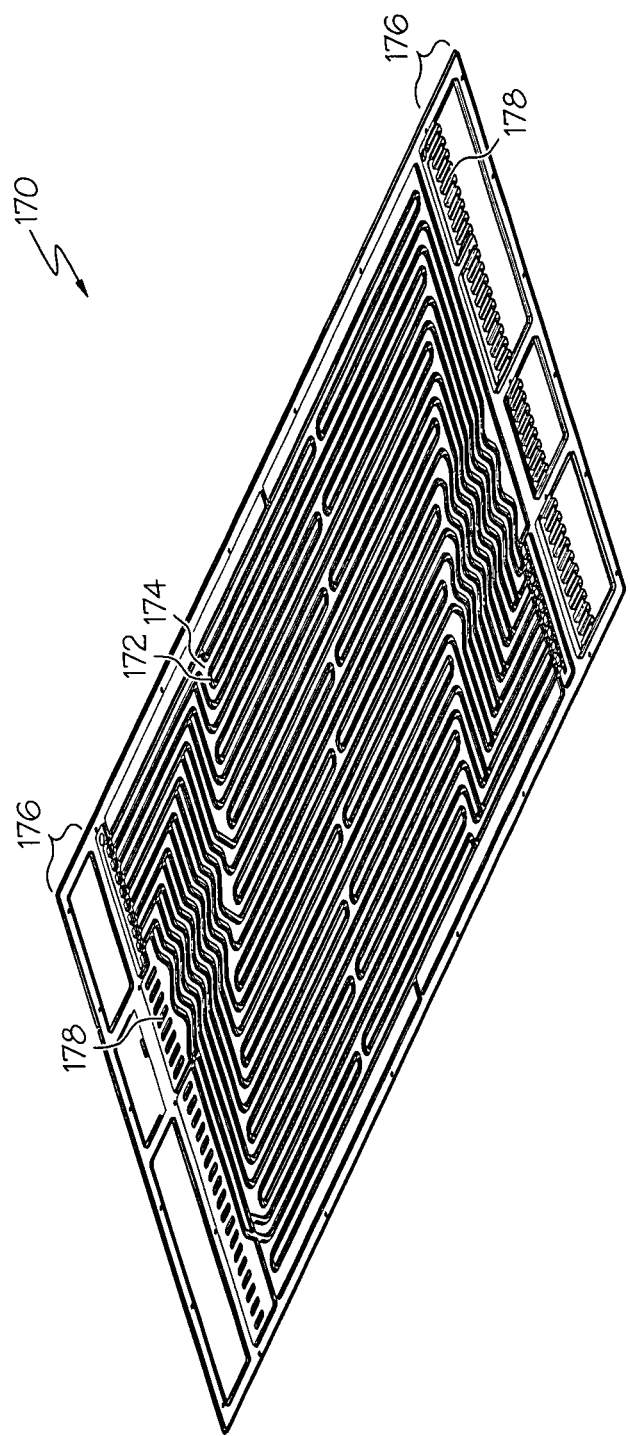
FIG. 2 is perspective view of one side of a bipolar plate made in accordance with the present invention.

Referring next to FIG. 2, a bipolar plate 170 according to an aspect of the present invention is shown. In the view shown, only the top side of the plate 170 can be seen; the opposite side that is not shown may be similarly configured. Headers 176 are situated at opposing edges of the plate 170, and define manifolds where reactant, coolant and other fluids used by a fuel cell can flow. Manifold grooves 178 can be used to segment the flow of fluid in one of the manifolds into the various channels 172. As can be seen, the channels 172 define a generally tortuous path (such as the serpentine path shown) over the surface of plate 170 to maximize the exposure of the fluid to an appropriate diffusion layer (not shown). Lands 174 define the channels 172 between them, and because the lands 174 project out of the plane of the plate 170 more than the other structures situated thereon, they may establish contact with the diffusion layer when pressed together.

The bipolar plate 170 may be made from a stainless steel alloy. In the present context, a stainless steel alloy comprises, in addition to iron, corrosion-inhibiting materials, such as chromium, nickel, molybdenum, copper or the like. In one particular form, the stainless steel may be an austenitic stainless steel, which may contain between about 16 and 26 weight percent chromium and about 8 to 22 weight percent nickel. A couple of well-known examples of an austenitic stainless steel are the American Iron and Steel Institute (AISI) Type 304 and Type 316 varieties, that may also include small amounts of manganese, molybdenum or the like. In another particular form, the stainless steels used for the bipolar plates discussed herein may be formed from binary alloys, where iron-chrome and nickel-chrome form the basis for such alloys. This class of binary alloys are particularly useful because they yield good contact resistance without having to resort to surface texturing (although such techniques could still be used, if desired). Other alloys, such as iron-nickel alloys, will less likely be used for the base material because of their lack of corrosion resistance. Such binary alloys can be used either as a coating deposited on the surface of a conventional stainless steel alloy, or be the primary constituents used to make up the bipolar plate 170 itself. In the former, the coating can be placed on the lands 174 to ensure a high electrical conductivity contact with the diffusion layer. Table 1 shows different binary alloys and their nominal compositions, as well as measured values of contact resistance (CR) for a single compression setting of 200 pounds per square inch, which is a value typically employed to connect a bipolar plate to a diffusion layer.

TABLE 1

| Sample ID | Cr (w/o) | Ni (w/o) | Fe (w/o) | CR (mohm/cm$^2$) |
|---|---|---|---|---|
| GMR1 |  | 20 | 80 | 116.0 |
| GMR2 |  | 40 | 60 | 45.0 |
| GMR3 |  | 60 | 40 | 26.5 |
| GMR4 |  | 80 | 20 | 14.5 |
| GMR5 | 20 |  | 80 | 170.0 |
| GMR6 | 40 |  | 60 | 163.0 |
| GMR7 | 60 | 40 |  | 12.4 |
| GMR8 | 80 | 20 |  | 7.7 |

As can be seen, the alloys with a majority of nickel or chromium (such as the samples identified as GMR3, GMR4, GMR7 and GMR8, as well as combinations thereof) tended to produce the lowest values of CR. With particular reference to the nickel-chromium binary alloys (identified as samples GMR7 and GMR8 in the table), it may be that cost concerns prevent such alloys from being used as the primary alloy in bipolar plate 170, instead finding a more economical use as a coating on top of a plate made from a more conventional stainless steel alloy. With regard to manufacturability, all of the alloys identified above exhibit good weldability and formability, where the former is understood as referring to how unlikely a material will exhibit metal solidification cracking during welding, while the latter is understood as the ability to be formed into profiled plates by conventional forming approaches, such as stamping or the like.

Figure 3:
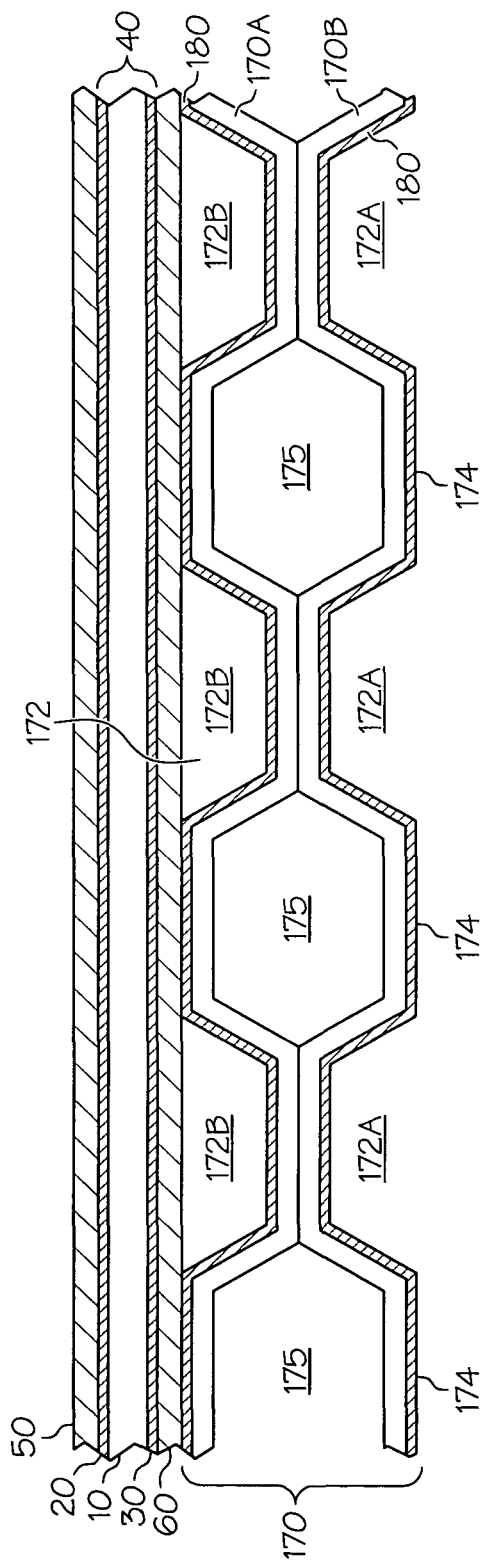
FIG. 3 is cutaway view of a bipolar plate made in accordance with the present invention placed adjacent a membrane electrode assembly.

Referring next to FIG. 3, a cross-sectional view of a bipolar plate 170 formed with MEA 40 on one side of plate 170 and accompanying diffusion layers 50 and 60 that can be arranged in a fuel cell stack according to an aspect of the present invention is shown. Typically, MEA 40 is positioned between the diffusion media layers 50 and 60, which in turn are oriented between a pair of hybrid bipolar plates 170 (only one of which is presently shown). The flow channels 172 are configured for the passage of reactant gas; specifically a hydrogen ($H_2$) containing gas into anode diffusion layer 50 and an oxygen ($O_2$) containing gas (such as air) in the cathode diffusion layer 60, the latter of which is shown in the figure. In one non-limiting form, the flow channel 172 is stamped into the metallic plate 170, where anode channels are shown as 172A and cathode channels shown as 172B. In general, the depth of these channels 172A, 172B are substantially similar. Lands 174 define projecting portions between the channels 172 such that fluid cross-talk among the various channels 172 is avoided. A plenum 175 formed between lands 174 that are aligned through the thickness of plate 170 can be used to convey coolant or other fluid, depending on the needs of the plate 170.

As shown with particularity in the figure, a coating 180 is formed on the surfaces of plate sheets 170A and 170B. Preferably, the coating is made from a nickel-chrome based alloy, including one or more of the aforementioned binary alloys. While shown covering both the channels 172 and lands 174, it will be apparent from the remainder of the disclosure that the application of the coating may be more selective, for example covering only the generally planar top surface of the lands 174. The relatively thin layer, coupled with the judicious application of the coating on contact-specific locations (such as the planar surface on the top of the lands 174) allows the use of more expensive materials (for example, a nickel-chrome binary alloy) that may not otherwise be practical. In another embodiment (not shown), the nickel-chrome based material can be used to form the substantial entirety of bipolar plate 170. In such a configuration, no separate coating is necessary, thereby reducing manufacturing costs. The choice between a high nickel content coating disposed on a conventional austenitic stainless steel or a plate made entirely of a high nickel content material depends on the application. For example, specialty applications (such as military, aerospace or marine), where cost is not as significant, may be compatible with a plate made entirely of a high nickel content material.

Figure 4:
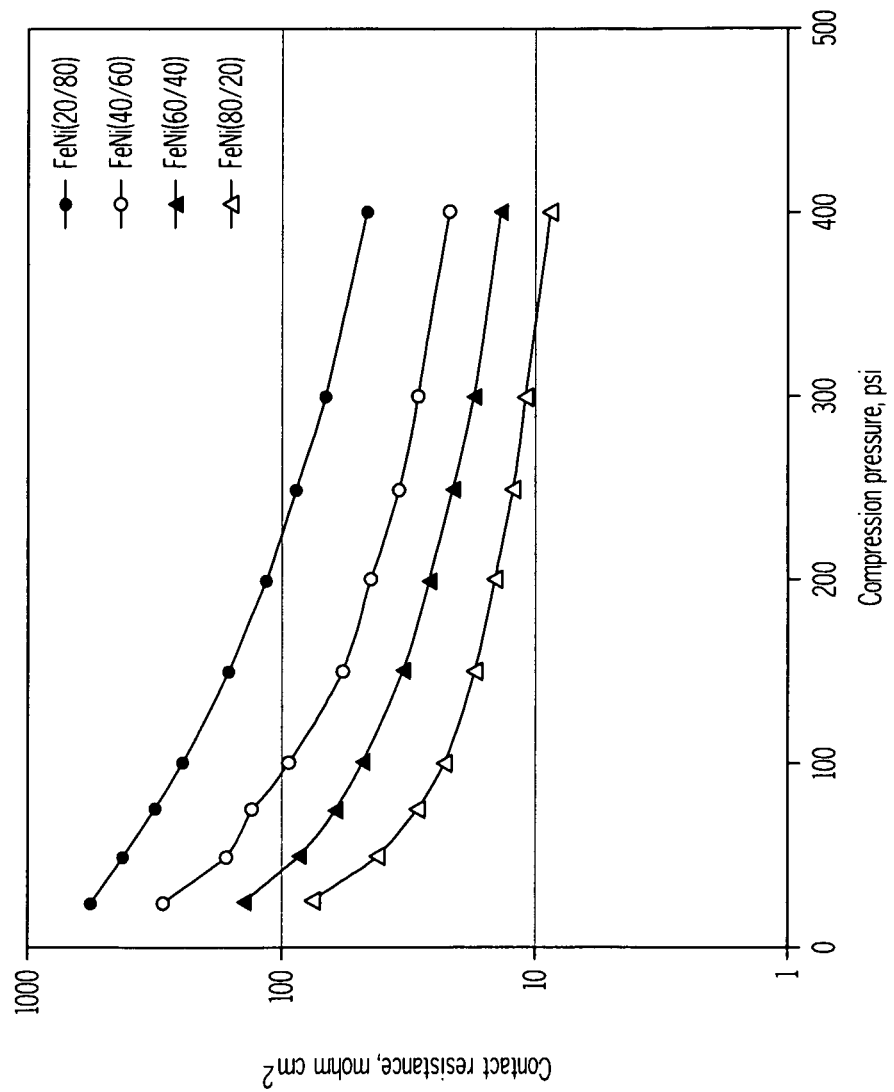
FIG. 4 is a chart showing the relationship between iron-to-nickel concentrations in a binary alloy and contact resistance.

Referring next to FIG. 4, a chart comparing the contact resistance of four different iron-nickel alloy compositions against a simulated diffusion layer for various compression pressures is shown. The setup included having each of the binary alloys compressed between two Toray T1.0 gas diffusion media (GDM) at predetermined pressures using a force-controlling instrument (such as an Instron® or related universal testing machine) and subjected to a known current through its thickness direction. By measuring the voltage drop across the sample and knowing the sample area, the specific area resistance was calculated using Ohm's Law. In this study, 6.45 A or 1 A/cm$^2$ was used throughout, and the resistance dependence on pressure was determined. All values were measured between gold-coated copper blocks to reduce measurement variations.

As can be seen from the figure, the iron-based materials (with 20% by weight and 40% by weight nickel, respectively) exhibit higher levels of electrical resistance than the nickel-based materials (with 60% by weight and 80% by weight nickel, respectively) under the same compression loading. Other alloys, such as iron-chromium, did not show an appreciable change in contact resistance with changing chromium content, at least up to 40% chromium. The present inventors did not evaluate higher chromium contents, as stable alloys above about 40% could not be made. Likewise, existing commercial nickel-chrome alloys, including some with up to 34% chromium by weight show undesirably higher resistances. Mechanistically speaking, increasing the nickel content to above 60% is related to the enrichment of the passive film. By setting a notional CR target below 10 mohm per cm$^2$, the present inventors have discovered that such levels are readily achievable using the 80/20 nickel-chrome alloy. These results are generally consistent with the results shown above in Table 1, where significant differences in CR were identified.

Figure 5:
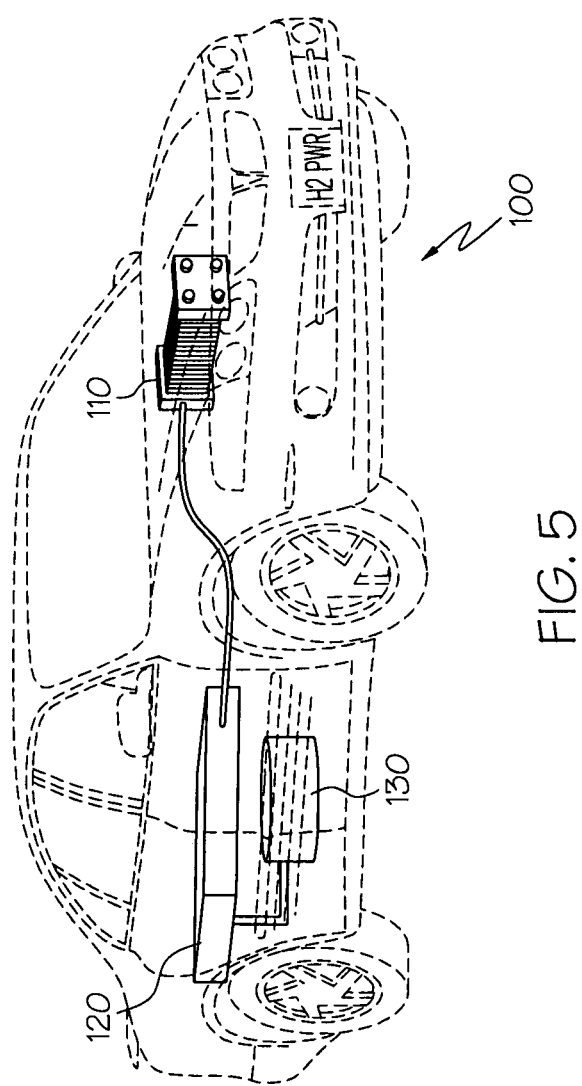
FIG. 5 is a schematic illustration of a vehicle having a fuel processing system and a fuel cell-based motive power supply in accordance with the present invention.

Referring next to FIG. 5, the device of the present invention may further include a vehicle, such as car 100 with a fuel cell stack 110. The fuel cell stack 110 may be configured to provide at least a portion of the motive or related propulsive needs of car 100, which may also have a fuel processing system 120 to supply the fuel cell stack 110 with hydrogen or related reactant fuel. A fuel storage tank 130 is also included to provide an on-board source of reactant precursor, such as methanol, gasoline or some other fuel capable of being reformed. In one form, the fuel processing system 120 may process the precursor drawn from storage tank 130 through suitable reactions. For example, the fuel processing system 120 may include an autothermal reactor (not shown) to serve as the primary reformation of methanol, while downstream water-gas shift reactor (not shown) and a final stage oxidizer, membrane or related scrubber (none of which are shown) can be used to reduce the carbon monoxide level down to the extremely low values needed to avoid poisoning the PEM catalyst. It will be appreciated by those having skill in the art that the placement of the fuel cell stack 110 is purely notional, and that it may be used or placed in any suitable manner within the car 100. It will also be appreciated by those skilled in the art that other vehicular forms may be used in conjunction with the fuel cell stack 110, fuel processing system 120 and fuel storage tank 130, such as a truck, motorcycle, aircraft, spacecraft or watercraft.

Unless otherwise indicated, all numbers expressing quantities are approximations that may vary depending on the desired properties sought to be obtained in embodiments of the present invention. As such, they may all be understood to be modified by the approximation "about". It is likewise noted that terms such as "preferably," "commonly," and "typically" are not utilized herein to limit the scope of the claimed invention or to imply that certain features are critical, essential, or even important to the structure or function of the claimed invention, but rather to highlight alternative or additional features that may or may not be utilized in a particular embodiment of the present invention. Furthermore, the term "substantially" is utilized herein to represent the inherent degree of uncertainty that may be attributed to any quantitative comparison, value, measurement, or other representation, and as such may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A stainless steel bipolar plate for a fuel cell, said bipolar plate comprising opposing surfaces at least one of which comprises a plurality of flow channels formed therein and a plurality of lands interspersed with said plurality of flow channels, at least a portion of said plurality of lands coated with a binary alloy having greater than 60 percent by weight nickel and exhibiting corrosion resistance and low contact resistance;

wherein said plurality of lands are configured to (i) form an electrically-conductive contact with a fuel cell diffusion layer placed thereagainst; and (ii) have reduced contact resistance between said bipolar plate and the diffusion layer relative to no such alloy being present.

2. The bipolar plate of claim 1, wherein said stainless steel bipolar plate comprises austenitic stainless steel.

3. The bipolar plate of claim 2, wherein at least a top surface of said lands forming said electrically-conductive contact has a reduced iron content relative to an amount initially present in said austenitic stainless steel.

4. The bipolar plate of claim 1, wherein said nickel-based alloy comprises a nickel-chromium binary alloy.

5. The bipolar plate of claim 1, wherein said nickel-based alloy is selected from the group consisting of nickel-iron alloys and nickel-chromium alloys.

6. The bipolar plate of claim 1, wherein said electrically conductive contact comprises a textured surface.

7. A device, comprising:
at least one polymer electrode membrane fuel cell comprising (i) a membrane electrode assembly; (ii) a diffusion media in fluid communication with one electrode of said membrane electrode assembly; and (iii) a bipolar plate in fluid communication with said diffusion media such that a reactant introduced into said bipolar plate travels along channels formed therein in order to pass through said diffusion media in order to be placed in contact with said electrode;
wherein at least a portion of said bipolar plate is configured to form an electrically-conductive contact with said diffusion media such that at least a portion of said electrically-conductive contact comprises a binary alloy coating comprising greater than 60 percent by weight nickel, the alloy exhibiting corrosion resistance and low contact resistance; wherein the device is configured to reduce contact resistance between said bipolar plate and said diffusion media relative to no such alloy being present.

8. The device of claim 7, wherein said nickel-based alloy is a nickel-chromium alloy.

9. A fuel processing system comprising the device of claim 7, for providing said at least one fuel cell with said first reactant, wherein said first reactant comprises hydrogen gas.

10. A vehicle coupled to the device of claim 9 such that an electrochemical catalytic reaction produced in said fuel cell with a reactant produced by said fuel processing system at least partially provides motive power to said vehicle.

11. The device of claim 7, wherein a substantial entirety of said bipolar plate is made of said nickel-based alloy.

12. A method of preparing a polymer electrode membrane fuel cell, said method comprising:

(i) arranging a membrane electrode assembly to comprise an anode, a cathode and a membrane disposed between said anode and cathode;
(ii) arranging an anode diffusion layer to be placed in fluid communication with said anode and a cathode diffusion layer to be placed in fluid communication with said cathode; and
(iii) arranging a stainless steel bipolar plate to comprise a plurality of flow channels and a plurality of lands interspersed with said plurality of flow channels such that upon operation of said fuel cell, reactants introduced from a fuel source and an oxygen source respectively can be delivered to said anode and said cathode through a flowpath established by said bipolar plate and a respective one of said diffusion layers;
wherein said bipolar plate is configured such that upon placement in contact with a respective one of said anode diffusion layer and said cathode diffusion layer, said plurality of lands forms an electrically-conductive contact with said respective diffusion layer placed thereagainst; and
wherein at least a portion of said lands forming said electrically-conductive contact comprises a binary alloy coating comprising greater than 60 percent by weight nickel and exhibiting corrosion resistance and low contact resistance; wherein said plurality of lands are configured to reduce contact resistance between said bipolar plate and said respective diffusion layer relative to no such alloy being present.

13. The method of claim 12, wherein said coating is disposed on at least a portion of said plurality of lands using an arc vapor deposition technique.

14. The method of claim 12, wherein said stainless steel bipolar plate comprises austenitic stainless steel.

15. The method of claim 14, wherein at least a portion of iron initially present in said austenitic stainless steel is removed from at least a top surface of said lands forming said electrically-conductive contact such that a layer rich with nickel-chromium forms on said surface.

16. The method of claim 15, wherein said iron is removed by heat treating said at least at a top surface and subsequently dissolving resulting iron oxide scale.

17. The method of claim 12, further comprising creating a surface texture in at least a portion of said electrically conductive contact.

* * * * *